United States Patent
Koizumi et al.

(10) Patent No.: US 7,379,851 B2
(45) Date of Patent: May 27, 2008

(54) CDMA SIGNAL WAVEFORM QUALITY DISPLAY SYSTEM, METHOD, AND PROGRAM, AND STORAGE MEDIUM STORING THE PROGRAM

(75) Inventors: Satoshi Koizumi, Tokyo (JP); Juichi Nakada, Tokyo (JP); Hideki Ichikawa, Tokyo (JP); Eiji Nishino, Tokyo (JP)

(73) Assignee: Advantest Corporation, Tokyo (JP)

( * ) Notice: Subject to any disclaimer, the term of this patent is extended or adjusted under 35 U.S.C. 154(b) by 766 days.

(21) Appl. No.: 10/297,484

(22) PCT Filed: Jun. 8, 2001

(86) PCT No.: PCT/JP01/04843

§ 371 (c)(1),
(2), (4) Date: Apr. 15, 2003

(87) PCT Pub. No.: WO01/95535

PCT Pub. Date: Dec. 13, 2001

(65) Prior Publication Data

US 2004/0039763 A1    Feb. 26, 2004

(30) Foreign Application Priority Data

Jun. 9, 2000  (JP) .............................. 2000-173484
Jun. 12, 2000 (JP) .............................. 2000-175176

(51) Int. Cl.
     *H03F 1/26* (2006.01)
(52) U.S. Cl. .................. 702/189; 370/241; 370/342; 455/522; 708/300
(58) Field of Classification Search ............ 702/189; 370/241, 335, 342, 468, 441; 375/322, 242, 375/295; 455/69, 522; 345/440.1, 440.2, 345/581; 708/300
See application file for complete search history.

(56) References Cited

U.S. PATENT DOCUMENTS

| | | | | |
|---|---|---|---|---|
| 5,087,808 A | * | 2/1992 | Reed | 250/214 R |
| 6,219,340 B1 | * | 4/2001 | Cutler et al. | 370/241 |
| 6,356,531 B1 | * | 3/2002 | Soliman | 370/241 |
| 6,850,238 B2 | * | 2/2005 | Bryant et al. | 345/440.1 |
| 2002/0150265 A1 | * | 10/2002 | Matsuzawa et al. | 381/94.2 |
| 2003/0025704 A1 | * | 2/2003 | Bryant et al. | 345/581 |
| 2004/0032897 A1 | * | 2/2004 | Kuntz et al. | 375/130 |
| 2004/0166886 A1 | * | 8/2004 | Laroia et al. | 455/522 |
| 2006/0056359 A1 | * | 3/2006 | Franke et al. | 370/335 |

FOREIGN PATENT DOCUMENTS

DE    19955564 A1    5/2000

(Continued)

OTHER PUBLICATIONS

Tsuneo Ishibashi; CDMA wo dou Keisoku Hyouka suruka? Electronics, Mar. 1997, vol. 42, No. 3, pp. 46 to 48.

(Continued)

*Primary Examiner*—Carol S Tsai
(74) *Attorney, Agent, or Firm*—Greenblum & Bernstein, P.L.C.

(57) ABSTRACT

A signal power coefficient and a noise power coefficient are calculated for each channel, using parameters which have been optimized up to a small error value by an optimizing means, then using the thus-calculated signal power coefficient and noise power coefficient, there are determined a signal power and a noise power for each channel, and the signal power and the noise power thus determined are displayed on one and same display screen channel by channel.

10 Claims, 13 Drawing Sheets

FOREIGN PATENT DOCUMENTS

| | | |
|---|---|---|
| EP | 0 847 153 A2 | 6/1998 |
| JP | 61138118 A * | 6/1986 |
| JP | 9-307525 A | 11/1997 |
| JP | 10-173628 A | 6/1998 |
| JP | 2000-36802 A | 2/2000 |
| JP | 2000-134180 A | 5/2000 |
| JP | 2001-189711 A | 7/2001 |

OTHER PUBLICATIONS

Kiyoshi Hashiba et al; "CDMA Shingou no Hyouka Gujutsu"; Probo, (1997), No. 10, pp. 15 to 18.

"Universal Mobile Telecommunications System (UMTS); Terminal Conformance Specification; Radio Transmission and Reception (TDD); (3G TS 34.122 version 1.2.1 Release 1999); ETSI TS 134 122", 3GPP, Online! Mar. 15, 2000, XP-002315905.

Zhongde Wang Ed—Institute of Electrical and Electronics Engineers: "In-Place and In-Order Algorithms for Paley- and Sequency-Ordered Walsh-Hadamard Transforms", Proceedings of the International Symposium of Electromagnetic Compatibility, Washington, Aug. 21-23, 1990, New York, IEEE, U.S. Aug. 21, 1990, pp. 90-94, XP000224638), p. 90, left-hand column.

Birgenheir R A: "Overview of Code-Domain Power, Timing, and Phase Measurements", Hewlett-Packard Journal, Hewlett-Packard Co., Palo Alto, U.S., vol. 47, No. 1, Feb. 1996, pp. 73-93, XP000559992.

* cited by examiner

Walsh Code Length L=8

A

| Ordinary Order of Walsh Code | Walsh Code | | | | | | | |
|---|---|---|---|---|---|---|---|---|
| 0 | 0 | 0 | 0 | 0 | 0 | 0 | 0 | 0 |
| 1 | 0 | 1 | 0 | 1 | 0 | 1 | 0 | 1 |
| 2 | 0 | 0 | 1 | 1 | 0 | 0 | 1 | 1 |
| 3 | 0 | 1 | 1 | 0 | 0 | 1 | 1 | 0 |
| 4 | 0 | 0 | 0 | 0 | 1 | 1 | 1 | 1 |
| 5 | 0 | 1 | 0 | 1 | 1 | 0 | 1 | 0 |
| 6 | 0 | 0 | 1 | 1 | 1 | 1 | 0 | 0 |
| 7 | 0 | 1 | 1 | 0 | 1 | 0 | 0 | 1 |

Walsh Code Length L=8

B

| Paley Order of Walsh Code | Walsh Code | | | | | | | |
|---|---|---|---|---|---|---|---|---|
| 0 | 0 | 0 | 0 | 0 | 0 | 0 | 0 | 0 |
| 4 | 0 | 0 | 0 | 0 | 1 | 1 | 1 | 1 |
| 2 | 0 | 0 | 1 | 1 | 0 | 0 | 1 | 1 |
| 6 | 0 | 0 | 1 | 1 | 1 | 1 | 0 | 0 |
| 1 | 0 | 1 | 0 | 1 | 0 | 1 | 0 | 1 |
| 5 | 0 | 1 | 0 | 1 | 1 | 0 | 1 | 0 |
| 3 | 0 | 1 | 1 | 0 | 0 | 1 | 1 | 0 |
| 7 | 0 | 1 | 1 | 0 | 1 | 0 | 0 | 1 |

Fig. 9

Walsh Code Length L=4

A

| Ordinary Order of Walsh Code | Walsh Code |
|---|---|
| 0 | 0 0 0 0 |
| 1 | 0 1 0 1 |
| 2 | 0 0 1 1 |
| 3 | 0 1 1 0 |

Walsh Code Length L=4

B

| Paley Order of Walsh Code | Walsh Code |
|---|---|
| 0 | 0 0 0 0 |
| 2 | 0 0 1 1 |
| 1 | 0 1 0 1 |
| 3 | 0 1 1 0 |

CDMA SIGNAL WAVEFORM QUALITY DISPLAY SYSTEM, METHOD, AND PROGRAM, AND STORAGE MEDIUM STORING THE PROGRAM

FIELD OF ART

The present invention relates to the display of CDMA signal waveform quality.

BACKGROUND ART

The applicant in the present case has previously proposed such a CDMA signal waveform quality measuring method as disclosed in Japanese Patent Laid Open No. 173628/1998. FIG. 13 shows an example of power display of various channels as measured by the measuring method disclosed therein.

In FIG. 13, electric power W is plotted along the axis of ordinate, while channels CH are plotted along the axis of abscissa. In the example of FIG. 13, Walsh code length is set at "32" to permit connection of 32-channel lines, and a state is shown in which channels 0, 1, 3, 5, 7, 9, 11, 13 . . . 29, and 31 are generating signals.

According to the conventional method for displaying the result of CDMA signal waveform quality measurement, a signal power of each channel is merely displayed and the measurement of noise level is not performed. Particularly, the measurement of noise level is an important parameter, for example, in case of building a base station for portable radio communication and making tests.

It is an object of the present invention to provide a CDMA signal waveform quality display system capable of measuring a noise level for each channel and displaying the result of the noise level measurement on a power display screen and further capable of displaying both signal power and noise power of each channel on one and same screen.

DISCLOSURE OF THE INVENTION

According to the present invention as described in claim 1, a CDMA signal waveform quality display system includes: an orthogonal transformer for orthogonal transformation of a digital measurement signal in each channel into a base band signal and correcting a carrier frequency error; a demodulator for demodulating the measurement signal in each channel corrected by the orthogonal transformer to afford demodulated data and an amplitude value; an ideal signal generator for generating an ideal signal in each channel from the demodulated data, the amplitude value, and estimated parameters; a parameter estimator for estimating various parameters in each channel from the ideal signal in each channel and the corrected measurement signal in each channel; an optimizing unit which, using the estimated parameters, performs the correction in the orthogonal transformer and the generation of the ideal signal in the ideal signal generator, further performing the processings in the demodulator and the parameter estimator, and which repeats the correction, demodulation, and estimation until the estimated parameters are optimized; a power coefficient calculator which calculates a power coefficient of the measurement signal in each channel in the optimized state in the optimizing unit; a noise power coefficient calculator which calculates a noise coefficient channel by channel; and a calculation result display which determines a signal power and a noise power on the basis of the power coefficient in each channel calculated in the power coefficient calculator and the noise power coefficient in each channel calculated in the noise power coefficient calculator and which displays the signal power and noise power on one and same display.

According to the present invention as described in claim 2, a CDMA signal waveform quality display system includes: a power measuring unit for measuring a signal component power of a signal to be measured in a certain specific channel to be measured; a noise component power measuring unit for measuring a noise component power of the signal to be measured in the channel to be measured; and a calculation result display unit for displaying a graph having a length proportional to the value of the signal component power and a graph having a length proportional to the value of the noise component power in such a manner that in a longitudinal direction of one of the graphs there is disposed the other graph.

The present invention as described in claim 3, is a CDMA signal waveform quality display system according to claim 2, wherein in the case where the channel to be measured is free of the signal component power, the calculation result display unit displays the graph having a length proportional to the value of the noise component power.

The present invention as described in claim 4, is a CDMA signal waveform quality display system according to claim 2 or claim 3, wherein the calculation result display unit causes a marker to be displayed on a display surface and displays the value of the signal component power and of the noise component power in a position indicated by the marker.

The present invention as described in claim 5, is a CDMA signal waveform quality display system according to claim 2, wherein the calculation result display unit displays the graphs in such an arranged state of the graphs as avoids overlapping of the graphs, the graphs each having a width corresponding to a band width which is determined by a diffusion code length corresponding to the channel to be measured.

The present invention as described in claim 6, is a CDMA signal waveform quality display system according to claim 5, wherein the calculation result display unit displays the graphs in such a state as the graphs are arranged in accordance with Paley order to avoid overlapping of the graphs.

According to the present invention as described in claim 7, a CDMA signal waveform quality display method includes: an orthogonal transformation step for orthogonal transformation of a digital measurement signal in each channel into a base band signal and correcting a carrier frequency error; a demodulating step for demodulating the measurement signal in each channel corrected by the orthogonal transformation step to afford demodulated data and an amplitude value; an ideal signal generating step for generating an ideal signal in each channel from the demodulated data, the amplitude value, and estimated parameters; a parameter estimating step for estimating various parameters in each channel from the ideal signal in each channel and the corrected measurement signal in each channel; an optimizing step which, using the estimated parameters, performs the correction in the orthogonal transformation step and the generation of the ideal signal in the ideal signal generating step, further performing the processings in the demodulating step and the parameter estimating step, and which repeats the correction, demodulation, and estimation until the estimated parameters are optimized; a power coefficient calculating step which calculates a power coefficient of the measurement signal in each channel in the optimized state in the optimizing step; a noise power coefficient calculating step which calculates a noise coefficient channel by channel;

and a calculation result display step which determines a signal power and a noise power on the basis of the power coefficient in each channel calculated in the power coefficient calculating step and the noise power coefficient in each channel calculated in the noise power coefficient calculating step and which displays the signal power and noise power on one and same display.

According to the present invention as described in claim 8, a CDMA signal waveform quality display method includes: a power measuring step for measuring a signal component power of a signal to be measured in a certain specific channel to be measured; a noise component power measuring step for measuring a noise component power of the signal to be measured in the channel to be measured; and a calculation result display step for displaying a graph having a length proportional to the value of the signal component power and a graph having a length proportional to the value of the noise component power in such a manner that in a longitudinal direction of one of the graphs there is disposed the other graph.

The present invention as described in claim 9, is a program of instructions for execution by the computer to perform a CDMA signal waveform quality display processing, the CDMA signal waveform quality display processing including: an orthogonal transformation process for orthogonal transformation of a digital measurement signal in each channel into a base band signal and correcting a carrier frequency error; a demodulating process for demodulating the measurement signal in each channel corrected by the orthogonal transformation process to afford demodulated data and an amplitude value; an ideal signal generating process for generating an ideal signal in each channel from the demodulated data, the amplitude value, and estimated parameters; a parameter estimating process for estimating various parameters in each channel from the ideal signal in each channel and the corrected measurement signal in each channel; an optimizing process which, using the estimated parameters, performs the correction in the orthogonal transformation process and the generation of the ideal signal in the ideal signal generating process, further performing the processings in the demodulating process and the parameter estimating process, and which repeats the correction, demodulation, and estimation until the estimated parameters are optimized; a power coefficient calculating process which calculates a power coefficient of the measurement signal in each channel in the optimized state in the optimizing process; a noise power coefficient calculating process which calculates a noise coefficient channel by channel; and a calculation result display process which determines a signal power and a noise power on the basis of the power coefficient in each channel calculated in the power coefficient calculating process and the noise power coefficient in each channel calculated in the noise power coefficient calculating process and which displays the signal power and noise power on one and same display.

The present invention as described in claim 10, is a program of instructions for execution by the computer to perform a CDMA signal waveform quality display processing, the CDMA signal waveform quality display processing including: a power measuring process for measuring a signal component power of a signal to be measured in a certain specific channel to be measured; a noise component power measuring process for measuring a noise component power of the signal to be measured in the channel to be measured; and a calculation result display process for displaying a graph having a length proportional to the value of the signal component power and a graph having a length proportional to the value of the noise component power in such a manner that in a longitudinal direction of one of the graphs there is disposed the other graph.

The present invention as described in claim 11, is a computer-readable medium having a program of instructions for execution by the computer to perform a CDMA signal waveform quality display processing, the CDMA signal waveform quality display processing including: an orthogonal transformation process for orthogonal transformation of a digital measurement signal in each channel into a base band signal and correcting a carrier frequency error; a demodulating process for demodulating the measurement signal in each channel corrected by the orthogonal transformation process to afford demodulated data and an amplitude value; an ideal signal generating process for generating an ideal signal in each channel from the demodulated data, the amplitude value, and estimated parameters; a parameter estimating process for estimating various parameters in each channel from the ideal signal in each channel and the corrected measurement signal in each channel; an optimizing process which, using the estimated parameters, performs the correction in the orthogonal transformation process and the generation of the ideal signal in the ideal signal generating process, further performing the processings in the demodulating process and the parameter estimating process, and which repeats the correction, demodulation, and estimation until the estimated parameters are optimized; a power coefficient calculating process which calculates a power coefficient of the measurement signal in each channel in the optimized state in the optimizing process; a noise power coefficient calculating process which calculates a noise coefficient channel by channel; and a calculation result display process which determines a signal power and a noise power on the basis of the power coefficient in each channel calculated in the power coefficient calculating process and the noise power coefficient in each channel calculated in the noise power coefficient calculating process and which displays the signal power and noise power on one and same display.

The present invention as described in claim 12, is a computer-readable medium having a program of instructions for execution by the computer to perform a CDMA signal waveform quality display processing, the CDMA signal waveform quality display processing including: a power measuring process for measuring a signal component power of a signal to be measured in a certain specific channel to be measured; a noise component power measuring process for measuring a noise component power of the signal to be measured in the channel to be measured; and a calculation result display process for displaying a graph having a length proportional to the value of the signal component power and a graph having a length proportional to the value of the noise component power in such a manner that in a longitudinal direction of one of the graphs there is disposed the other graph.

According to the present invention, since not only a signal power of each channel but also a noise power of each channel in CDMA signal is displayed on the same screen, it is possible to know a signal-to-noise ratio (S/N) easily. There accrues an advantage that it is possible to provide a CDMA signal waveform quality measuring system convenient for use.

BRIEF DESCRIPTION OF THE DRAWINGS

FIG. 2 is a diagram showing an example of an arithmetic expression;

FIG. 8 is a diagram showing an ordinary order and Paley order in case of Walsh code length being L=8;

FIG. 9 is a diagram showing an ordinary order and Paley order in case of Walsh code length being L=4;

BEST MODE FOR CARRYING OUT THE INVENTION

Embodiments of the present invention will be described hereinunder with reference to the accompanying drawings.

First Embodiment

Figure 1:
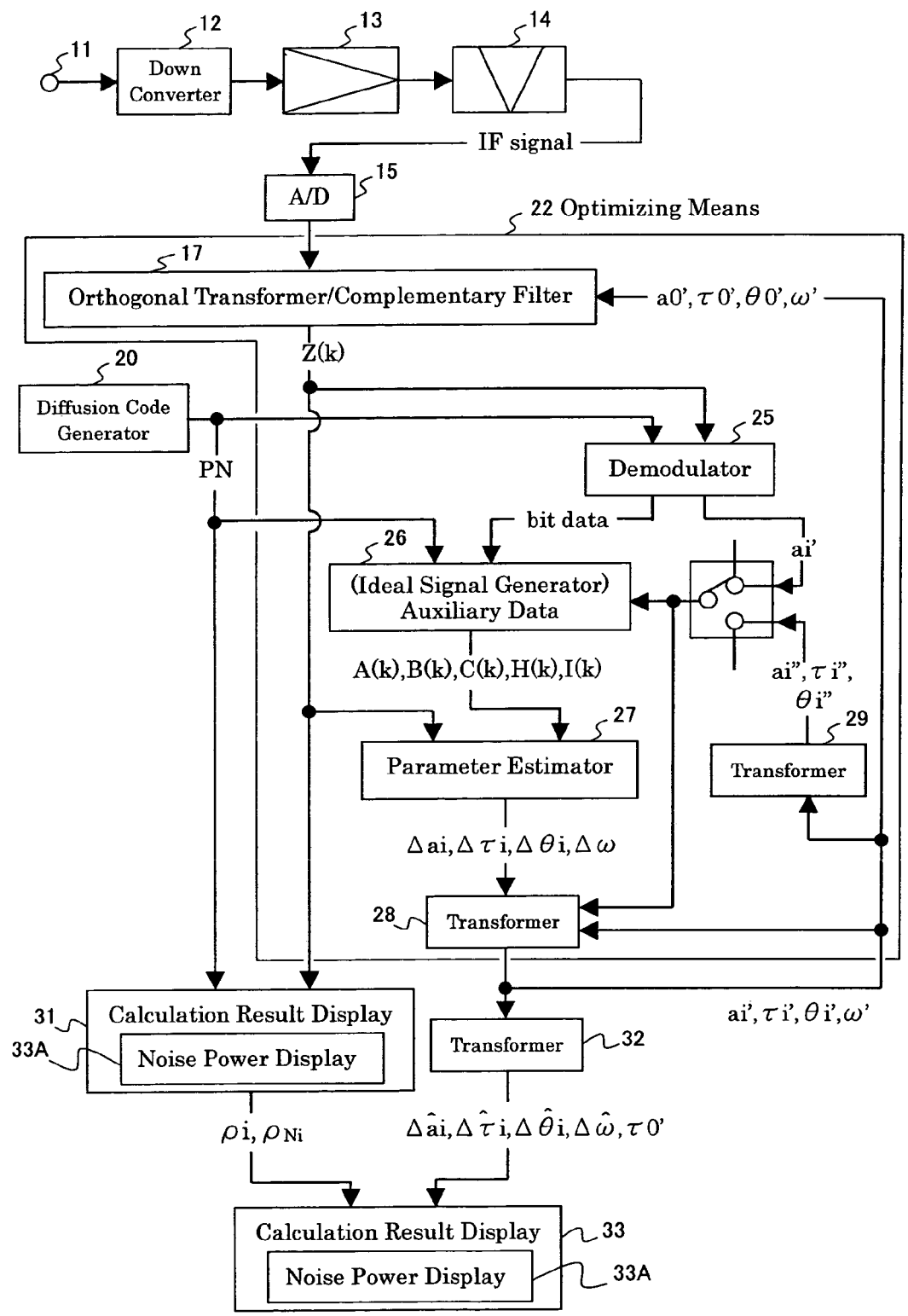
FIG. 1 is a block diagram showing the construction of a CDMA signal waveform quality display system according to a first embodiment of the present invention.

In FIG. 1, a frequency-diffused, multi-channel CDMA signal from a base station is inputted through an input terminal 11 and is converted to an intermediate frequency signal by means of a down converter 12. The intermediate frequency signal is amplified by an amplifier 13, then is band-limited by a filter 14, and is thereafter converted to a digital signal by an A/D converter 15. The digital intermediate frequency signal from the A/D converter 15 is converted to a base band signal by an orthogonal transformer 17 which includes a complementary filter, affording a base band measurement signal Z(k).

The base band measurement signal Z(k) is inverse-diffused in a demodulator 25 with a diffusion code (Walsh code) provided from a diffusion code generator 20 and bit data is demodulated for each channel. At the same time, amplitude a'i (i is channel number) of each channel is detected.

In an ideal signal generator 26, an ideal signal Ri (i is channel number) is produced on the basis of both bit data provided from the diffulator 25 and diffusion code PN (Walsh code) provided from the diffusion code generator 20. Further, in accordance with the ideal signal Ri, the following expressions are calculated to generate correction data Ai(k), Bi(k), Ci(k), Ii(k), and Hi(k):

$$A_i(k) = a'_i \cdot \left[ \sum_{m=-M}^{M} a(m) \cdot R_i(k-m) \right] \cdot e^{j\theta'_i} \quad (1)$$

$$B_i(k) = \left\{ \begin{array}{l} 2a'_i \cdot \left[ \sum_{m=-M}^{M} a(m) \cdot R_i(k-m) \right] \cdot \tau'_i + \\ a'_i \cdot \left[ \sum_{m=-M}^{M} b(m) \cdot R_i(k-m) \right] \end{array} \right\} \cdot e^{j\theta'_i} \quad (2)$$

$$C_i(k) = \left\{ \begin{array}{l} a'_i \cdot \left[ \sum_{m=-M}^{M} a(m) \cdot R_i(k-m) \right] \cdot \tau'^2_i + \\ a'_i \cdot \left[ \sum_{m=-M}^{M} b(m) \cdot R_i(k-m) \right] \cdot \tau'_i + \\ a'_i \cdot \left[ \sum_{m=-M}^{M} c(m) \cdot R_i(k-m) \right] \end{array} \right\} \cdot e^{j\theta'_i} \quad (3)$$

$$I_i(k) = \left\{ \begin{array}{l} \left[ \sum_{m=-M}^{M} a(m) \cdot R_i(k-m) \right] \cdot \tau'^2_i + \\ \left[ \sum_{m=-M}^{M} b(m) \cdot R_i(k-m) \right] \cdot \tau'_i + \\ \left[ \sum_{m=-M}^{M} c(m) \cdot R_i(k-m) \right] \end{array} \right\} \cdot e^{j\theta'_i} \quad (4)$$

$$H_i(k) = \left\{ \begin{array}{l} 2 \cdot \left[ \sum_{m=-M}^{M} a(m) \cdot R_i(k-m) \right] \cdot \tau'_i + \\ \left[ \sum_{m=-M}^{M} b(m) \cdot R_i(k-m) \right] \end{array} \right\} \cdot e^{j\theta'_i} \quad (5)$$

The ideal signal Ri is obtained in the following manner. Demodulated bit data of each channel i provided from the demodulator 25 are inverse-diffused with I- and Q-side diffusion codes (Walsh codes) provided from the diffusion code generator 20, then chips "0" and "1" in the thus inversion-diffused I- and Q-side chip rows are converted to $+\sqrt{2}$ and $-\sqrt{2}$, respectively to afford I and Q signals of QPSK signal with an amplitude of 1. That is, using the ideal signal Ri(k−m) with a normalized amplitude and the amplitude a'i from the demodulator 25, there are calculated auxiliary data Ai(k), Bi(k), Ci(k), Ii(k), and Hi(k).

Figure 2:
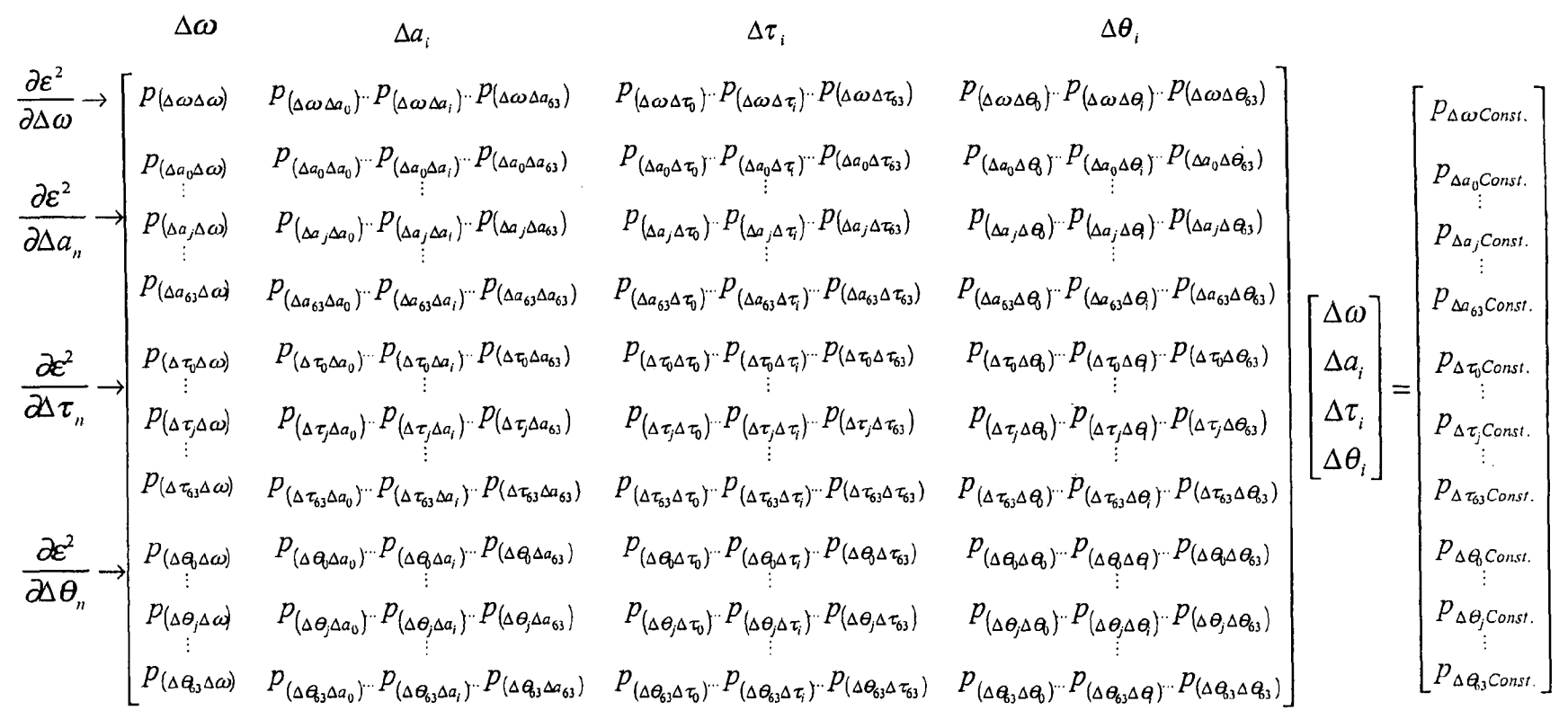

The auxiliary data Ai(k), Bi(k), Ci(k), Ii(k), and Hi(k) and the measurement signal Z(k) are inputted to a parameter estimator 27, in which simultaneous equations shown in FIG. 2 are solved and estimate values Δai, Δτi, Δθi, and Δω are obtained as solutions thereof. Using these estimate values, the correction parameters so far used a'i, τ'i, θ'i, and ω' are updated as follows in a transformer 28:

ω'←ω'+Δω a'i←a'i+Δai

τ'i←τ'i+Δτi

θ'i←θ'i+Δθi    (6)

Then, using the thus-corrected parameters a'i, τ'i, θ'i, and ω', correction is made for the measurement signal Z(k) and the thus-corrected measurement signal Z(k) is again subjected to the processings in the demodulator 25, the ideal signal/auxiliary data generator 26, the parameter estimator 27, and the transformer 28. These processings are carried out until the estimate values Δai, Δτi, Δθi, and Δω are optimized, that is, until reaching zero or near zero, or until there occurs no change of value ever with repetition. By this optimizing step, correction is made not only for the measurement signal Z(k) but also for the ideal signal Ri.

Therefore, an optimizing means 22 is constituted by the orthogonal transformer 17 which includes a complementary filter, the demodulator 25, the ideal signal generator 26, the parameter estimator 27, and the transformers 28 and 29.

Correction for the measurement signal Z(k) is made as follows relative to Z(k) of the last time:

$$Z(k) \leftarrow Z(t-\tau'0)(1/a'0)\exp[-j(\omega'(t-\tau'0)+\theta'0)] \quad (7)$$

As initial values are set a'0=1, τ'0=0, θ'0=0, and ω'=0, and each time estimate values are obtained in the parameter estimator 27, the expression (7) is calculated with respect to new a'i, τ'i, θ'i, and ω'. That is, this calculation for correction is made for the signal inputted to the orthogonal transformer/complementary filter 17, i.e., the output of the A/D converter 15.

The calculation for correction may be performed for the measurement signal Z(k) after conversion to the base band. However, this base band-converted signal is a signal after having passed the complementary filer (the same pass band width as the band width of the input signal). If there is a gross frequency error, this filter processing may result in that a portion of the signal is removed, that is, the measurement signal to be used in parameter estimation, etc., is chipped. Therefore, the result of the frequency estimation is corrected at a stage which precedes the complementary filter. But the correction may be made for the measurement signal after conversion to the base band, provided there is used a low pass filter of a sufficiently wide band without using the complementary filter in the orthogonal transformer/complementary filter 17.

The correction parameters a'i, τ'i, and θ'i are subjected to the following conversion in the transformer 29:

$$a''i = a'i/a'0$$

$$\tau''i = \tau'i - \tau'0$$

$$\theta''i = \theta'i - \theta'0 \text{ provided } i \neq 0 \quad (8)$$

As to the measurement signal Z(k), since the parameters of the $0^{th}$ channel are corrected by the expression (7), the parameters for correcting the $0^{th}$ ideal signal $R_0$ are normalized into the following values:

a''0=1

τ''0=0

θ''0=0

The parameters for the ideal signal Ri of channels other than the $0^{th}$ channel are corrected by $0^{th}$ parameters as in the expression (8).

That is, in the first repetition in the foregoing optimization step, correction for the measurement signal Z(k) is made using the correction parameters of the $0^{th}$ channel and therefore, as correction parameters used in the auxiliary data generator 26, there is used the expression (8) normalized by the parameters of the $0^{th}$ channel, i.e., a transformed output of the transformer 29. More particularly, the calculations of the expressions (1) to (5) are performed using parameters which are conceivable in the expression (8) to determine auxiliary data Ai(k), Bi(k), Ci(k), Ii(k), and Hi(k). In these calculations for determining auxiliary data there are used bit data and amplitude a'i, the bit data being obtained as a result of demodulating Z(k) in the demodulator 25 after correction by the expression (7).

Thus, both corrections described above are performed every time estimate values are obtained from the parameter estimator 27, and the estimation of parameters is again repeated until optimization of the estimate values, whereupon a power coefficient ρi is calculated and determined as follows in a power coefficient calculator 31, using measurement signal Z(k) and diffusion code (Walsh code) obtained at that instant:

$$\rho_i = \frac{\sum_{j=1}^{N}\left|\sum_{k=1}^{64} Z_{j,k} R_{i,j,k}^*\right|^2}{\left\{\sum_{k=1}^{64}|R_{i,j,k}|^2\right\}\left\{\sum_{j=1}^{N}\sum_{k=1}^{64}|Z_{j,k}|^2\right\}} \quad (9)$$

The expression (9) is the same as the expression defined by the CDMA signal measurement standard and used in the prior art.

The following calculation is performed in a transformer 32:

$$\hat{a} = a'$$

$$\Delta\hat{\tau}i = \tau'i - \tau'0$$

$$\Delta\hat{\theta}i = \theta'i - \theta'0$$

$$\Delta\hat{\omega} = \omega' \quad (10)$$

The parameters $\hat{a}$, $\Delta\hat{\tau}i$, $\Delta\hat{\theta}i$, $\Delta\hat{\omega}$, $\hat{\tau}0$, and the power coefficient ρi obtained in the power coefficient calculator 31 are displayed on a calculation result display 33.

As described above, the measurement signal Z(k) and the ideal signal Ri are corrected using estimated parameters, and the estimation of parameters is again performed using both corrected signals until optimization of the estimated parameters. Since all the parameters are used in this optimization, all the parameters are optimized, and after the optimization, the power coefficient ρi is determined using the measurement signal, so that the power coefficient ρi can be obtained with a high accuracy. Other parameters are also determined with a high accuracy because the measurement signal is included in the optimization loop.

In the CDMA signal waveform quality display system of the first embodiment, a noise coefficient calculator 31A is provided in the power coefficient calculator 31 to calculate a noise coefficient $\rho_{Ni}$ of each channel. Further, a noise power display 33A is provided in the calculation result display 33, and the noise coefficient $\rho_{Ni}$ of each channel calculated in the noise power coefficient calculator 31A is inputted to the noise power display 33A, allowing a noise power to be calculated.

Signal power and noise power of each channel are calculated in the following manner.

Signal power $W_s = 10.0 \times \log_{10}(\rho i)$

The value of ρi is obtained in the foregoing expression (9). Although in the expression (9) there is shown an example in which Walsh code length is fixed to 64, Walsh length actually takes the values of 4, 8, 16, 32, 64, 128, and 256 for various channels.

Noise power coefficient $\rho_{Ni}$ (code Domain Error) is calculated as follows using $Z_j \cdot k$ and $Ri \cdot j \cdot k$ in the expression (9).

The sum of channels in the ideal signal Ri is subtracted from the measurement signal Z to obtain an error signal N, and a power coefficient is determined as follows with respect to the error signal N:

$$N_{i\cdot k} = Z_{j\cdot k} - \sum_{i}^{L-1} R_{i\cdot j\cdot k}$$

$$\rho_{Ni} = \frac{\sum_{j=1}^{(M/L)}\left|\sum_{k=1}^{L} N_{j\cdot k} \times R^*_{i\cdot j\cdot k}\right|^2}{\left\{\sum_{k=1}^{L}|R_{i\cdot j\cdot k}|^2\right\}\left\{\sum_{j=1}^{(M/L)} \cdot \sum_{k=1}^{L}|Z_{j\cdot k}|^2\right\}}$$

A noise power $W_N$ of i channel is calculated as follows:

$$W_N = 10.0 \times \log_{10}(\rho_{Ni})$$

The result of the calculation is stored in a memory in a pair with the signal power $W_S$ channel by channel. The values of signal power $W_S$ and noise power $W_N$ in each channel are graphed by a graph plotting means (included in the calculation result display 33) and written as a graph in an image memory. The values of signal power $W_S$ and noise power $W_N$ in all the channels are all stored in the image memory, whereby the states of all the channels are displayed on the display.

Figure 3:
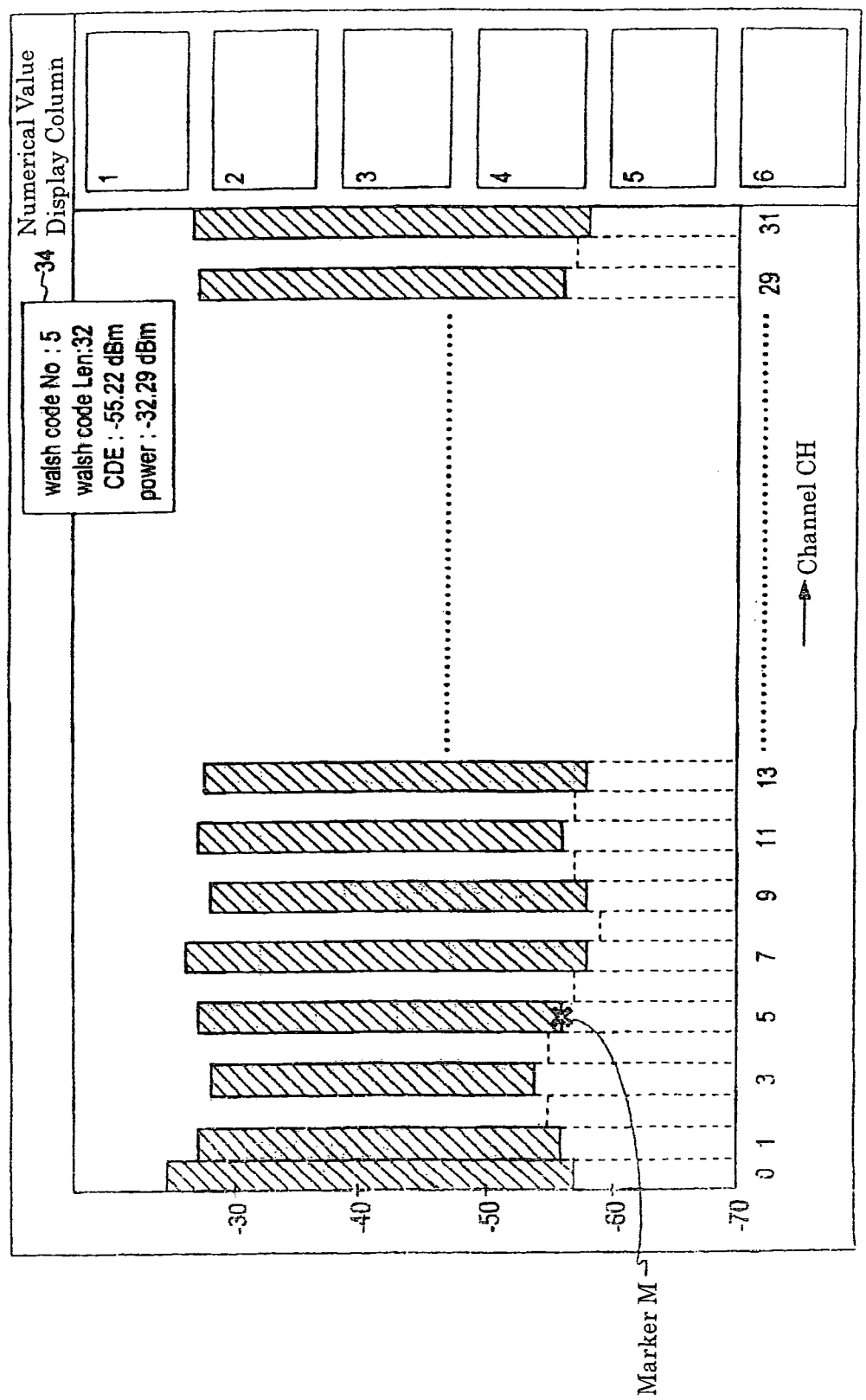
FIG. 3 is a diagram showing an example of display.

FIG. 3 shows an example of the plotting. In the same figure, hatched portions (graphs) with solid lines represent signal powers $W_S$ of the channels, while dotted line portions (graphs) represent noise powers $W_N$ of the channels. As shown in the figure, signal-free channels are also measured for noise power and the results are displayed. The height (length) of each graph represents the signal power $W_S$ and noise power $W_N$ of each channel. The graphs of noise power $W_N$ underlie vertical (longitudinal) extension lines of the graphs of signal power $W_S$.

In the channels 2, 4, 6, 8, 10, 12, . . . , 30 there is no signal power $W_S$ and only the graphs of noise power $W_N$ are shown.

The solid line and dotted line portions in FIG. 3 may actually be represented in different line colors in the case of a color display to make distinction in display between signal power $W_S$ and noise power $W_N$.

The symbol M in the figure stands for a marker. By moving the marker M to the portion whose measured value is to be known, it is possible to let the measured value at that position be displayed in a numerical value display column 34. In the state of display shown in FIG. 3, the channel indicated by the marker M is "5", Walsh code length is 32, noise power CDE is −55.22 dBm, and signal power POWER is −32.29 dBm.

Second Embodiment

This second embodiment is different from the first embodiment in that bar graphs are arranged and displayed in accordance with Paley order.

Figure 4:
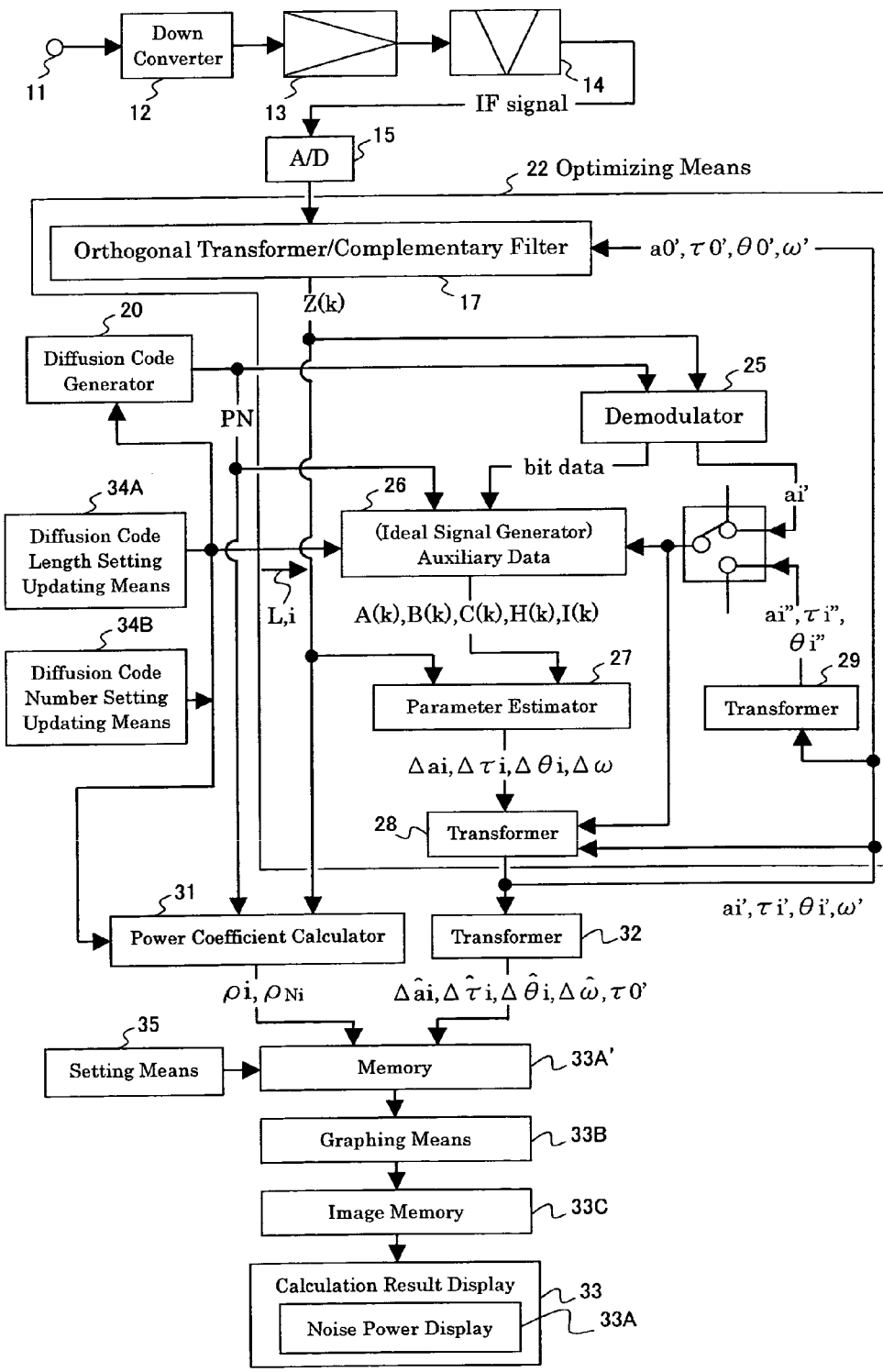
FIG. 4 is a block diagram showing the construction of a CDMA signal waveform quality display system according to a second embodiment of the present invention.

FIG. 4 is a block diagram showing the construction of a CDMA signal waveform quality display system according to the second embodiment of the present invention. In this embodiment the same portions as in the first embodiment are identified by like reference numerals and explanations thereof will be omitted.

The CDMA signal waveform quality display system of this second embodiment is further provided, in addition to the components described in the first embodiment, with a diffusion code length setting updating means 34A, a diffusion code number setting updating means 34B, a setting means 35, a memory 33A', a graphing means 33B, and an image memory 33C.

In accordance with diffusion code length L and diffusion code number i produced in the diffusion code length setting updating means 34A and the diffusion code number setting updating means 34B, the diffusion code generator 20 generates a diffusion code PN corresponding to all the channels for each diffusion code length L, and with this diffusion code PN the demodulator 25 demodulates the signal of each channel at each diffusion code length.

In this second embodiment there is added a construction in which the ideal signal generator 26 generates an ideal signal Ri from the data obtained by demodulation, and various parameters $\Delta ai$, $\Delta \tau i$, $\Delta \theta i$, and $\Delta \omega$ are produced in the parameter estimator 27 in accordance with the ideal signal Ri, then those parameters are fed back to the orthogonal transformer 17 for optimization processing, to afford a signal Z(k) with few errors.

The signal Z(k) with few errors is inputted to the power coefficient calculator 31, which in turn calculates power coefficients $\rho i$ of the channels. The power coefficients $\rho i$ thus calculated in the power coefficient calculator 31 and the parameters $\hat{a}i \cdot L$, $\Delta \hat{\tau} i \cdot L$, $\Delta \hat{\theta} i \cdot L$, $\Delta \hat{\omega}$, $\tau 0'$ outputted from the transformer 32 are stored in the memory 33A' in accordance with respective diffusion code lengths and diffusion code numbers.

A setting means 35 sets a to-be-displayed channel (the channel of a signal transmitted by a communication device being measured) among all the channels stored in the memory 33A' and reads the power coefficient $\rho i$ and parameters of the channel thus set. In this example, therefore, electric power of the channel set in the setting means 35 is displayed on the calculation result display 33.

Figure 5:
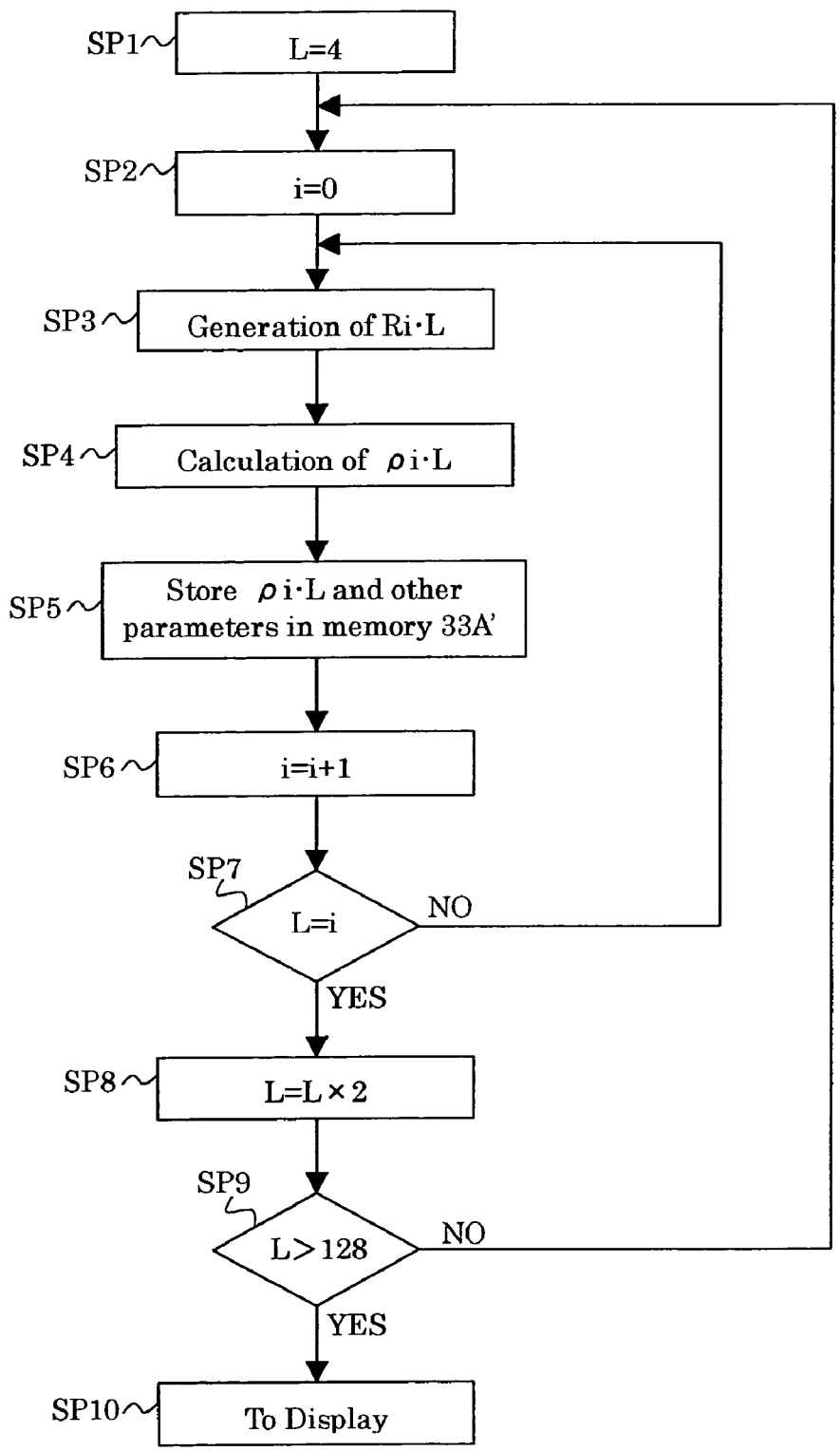
FIG. 5 is a flow chart showing the operation of a diffusion code length setting updating means 34A, that of a diffusion code number setting updating means 34B, and further showing in what state arithmetic processings are performed in various components.

FIG. 5 shows the operation of the diffusion code length setting updating means 34A and that of the diffusion code number setting updating means 34B and also shows in what state arithmetic processings are performed in various components.

In step SP1, Walsh code length as diffusion code length is initialized at L=4, then in step SP2, Walsh code (corresponding to channel number) as diffusion code number is set at i=0.

In step SP3, an ideal signal $Ri \cdot L$ based on Walsh code length L=4 and Walsh code i=0 is produced in the ideal signal generator 26.

In step SP4, parameters are estimated in the parameter estimator 27 in accordance with the ideal signal $Ri \cdot L$ and are then fed back to the orthogonal transformer 17 for optimization processing. Then, the power coefficient $\rho i \cdot L$ is calculated on the basis of the measurement signal Z(k) after optimization processing and the diffusion code produced in the diffusion code generator 20.

In step SP5, the power coefficient $\rho i \cdot L$ calculated in step SP4 and other parameters $\hat{a}i \cdot L$, $\Delta \hat{\tau} i \cdot L$, $\Delta \hat{\theta} i \cdot L$, $\Delta \hat{\omega}$, $\tau 0'$ are stored in the memory 33A'. At this time, the noise coefficient $\rho Ni$ is also stored in the memory 33A'.

In step SP6, the value of Walsh code i is updated as i+1, then in step SP7, the value of Walsh code length L and that of Walsh code i are compared with each other. If both disagree, the processing flow returns to step SP3. That is, in case of Walsh code length L=4, i=4 results from executing the steps SP3-SP7 four times, and the flow advances to step SP8.

In step SP8, the value L of Walsh code length is doubled for updating to L=8. In step SP9, a check is made to see if the value L of Walsh code length has become larger than the maximum value 128. If the value L of Walsh code length has become larger than the maximum value 128, the flow returns to step SP2.

In step SP2, initialization is made again to i=0 and the routine of steps SP3-SP7 is executed. With L=8, the routine of steps SP3-SP7 is executed eight times. In this eight-time execution, power coefficients ρi·L, noise coefficients ρNi, and parameters ^ai, Δ^τi, Δ^θi, Δ^ω, τ0' for eight channels of 0-7 defined for Walsh code length of L=8 are calculated and are stored in the memory 33A'.

In this way the Walsh code length L is updated in the order of 4, 8, 16, 32, 64, and 128, and power coefficient ρi·L, noise coefficient ρNi, and parameters ^ai, Δ^τi, Δ^θi, Δ^ω, τ0', are stored in the memory 33A' for each channels determined by each Walsh code length L.

If it is detected in step SP9 that the value L of Walsh length has exceeded the maximum value of 128, the processing flow branches to step SP10.

In step SP10, a power coefficient of each channel is calculated from the Walsh code length as a desired diffusion code length set in the setting means 35 and also from an address which depends on the diffusion code number (Walsh code number), and a signal power of each channel is determined from the power coefficient ρi thus obtained.

Signal power $W_S$ can be calculated as follows from the power coefficient ρi·L:

$$W_S = 10.0 \times \log_{10} (\rho i \cdot L)$$

This conversion to electric power can be done in the graphing means 33B for example. How to obtain the noise power $W_N$ is the same as in the first embodiment, and also in this case the graphing means 33B may be utilized.

Data converted to signal power and noise power can be graphed by the graphing means 33B, but in this example the level of electric power is represented in terms of a strip-like display region (bar graph) channel by channel. Therefore, the length in Y-axis direction of the strip-like display region depends on the converted electric power value. In the present invention. Moreover, the width (in X-axis direction) of the strip-like display region is determined correspondingly to the diffusion code length L.

In determining the said width, the width of the display region of channel belonging to L=4 in diffusion code length L is selected to the largest width W. The width is made corresponding to the value of diffusion code length L so that the larger the value of L, the narrower the width, like ½ of the width W in L=4 in case of the diffusion code length L=8, further, ½ width thereof, ¼ (W), in case of L=16, ½ width thereof, ⅛ (W), in case of L=32, . . . By so doing it is possible to clearly display the relation of channel band widths given to the diffusion code lengths.

Figure 6:
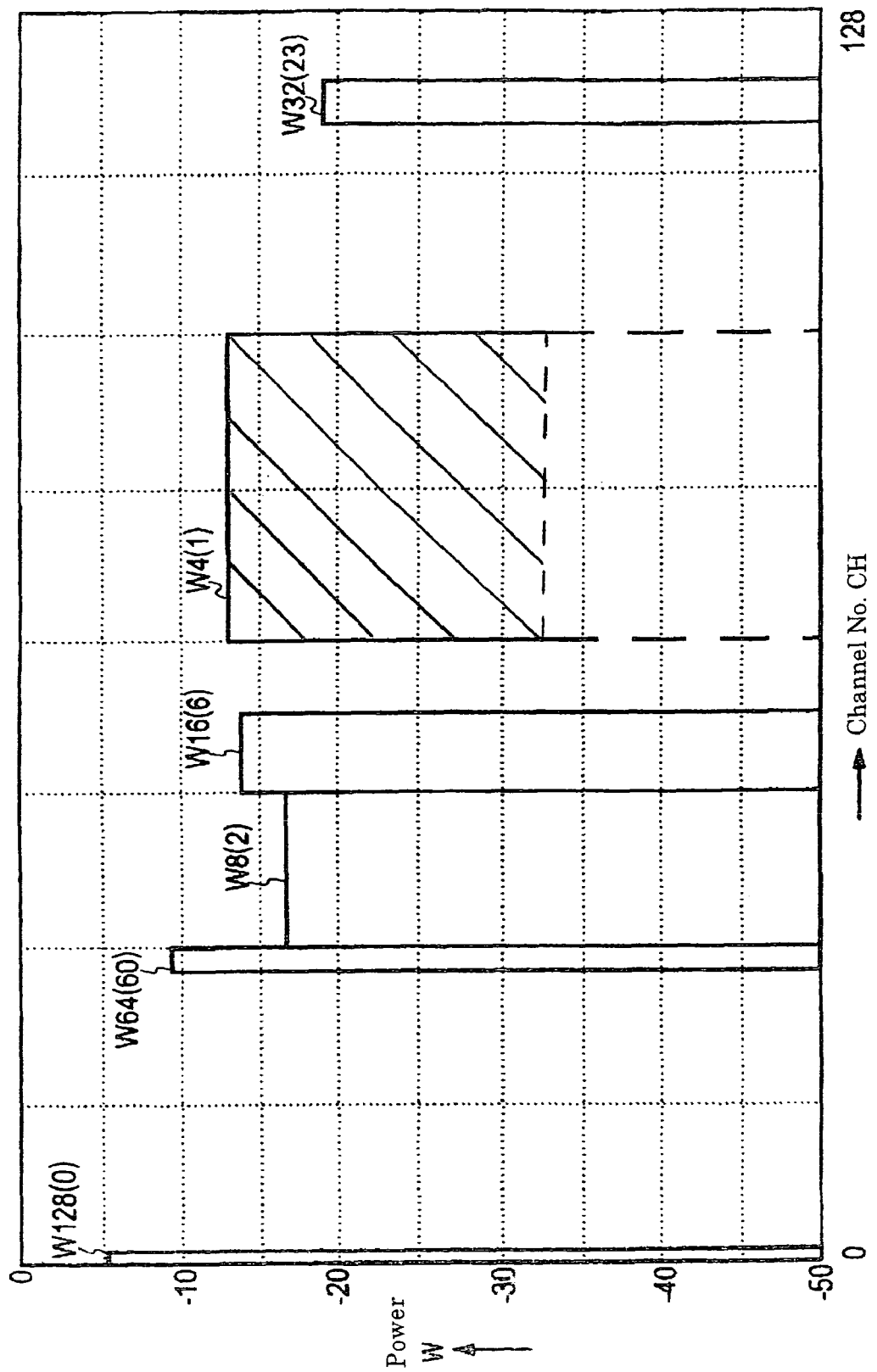
FIG. 6 is a diagram showing an example of display.

FIG. 6 shows an example of the display in question. W4 shown in FIG. 6 represents a display region given in terms of the diffusion code number "1" in diffusion code length L=4.

W8 represents a display region given in terms of the diffusion code number 2 in diffusion code length L=8.

W16 represents a display region given in terms of the diffusion code number 6 in diffusion code length L=16.

W32 represents a display region given in terms of diffusion code number 23 in diffusion code length L=32.

W64 represents a display region given in terms of diffusion code number 60 in diffusion code length L=64.

W128 represents a display region given in terms of diffusion code number 0 in diffusion code length L=128.

In FIG. 6, channel number and electric power are plotted along the axis of abscissa and the axis of ordinate, respectively. As shown at W4 in FIG. 6, it is preferable that a noise component graph underlie a signal component graph on an extension line of the length (height) of the latter graph, as in the first embodiment. This is also the same as the other display regions.

From a read address of power coefficient which is read out of the memory 33A' the graphing means 33B can know the diffusion code length L to which the read power coefficient ρi belongs. On the basis of the value of the diffusion code length L it is possible to determine the widths of the display regions W4, W8, W16, W32, W64, and W128.

In the graphing means 33B, moreover, colors can be affixed to the display regions W4, W8, W16, W32, W64, and W128 in accordance with the diffusion code number of the power coefficient read from the memory 33A'. In the example of FIG. 6, the contour lines of the display regions W4, W8, W16, W32, W64, and W128 may be colored in black, blue, green, dark blue, yellow, and red, respectively. The thus-colored image data are stored in the image memory 33C and the thus-stored images are displayed on a display result display 33D.

Figure 7:
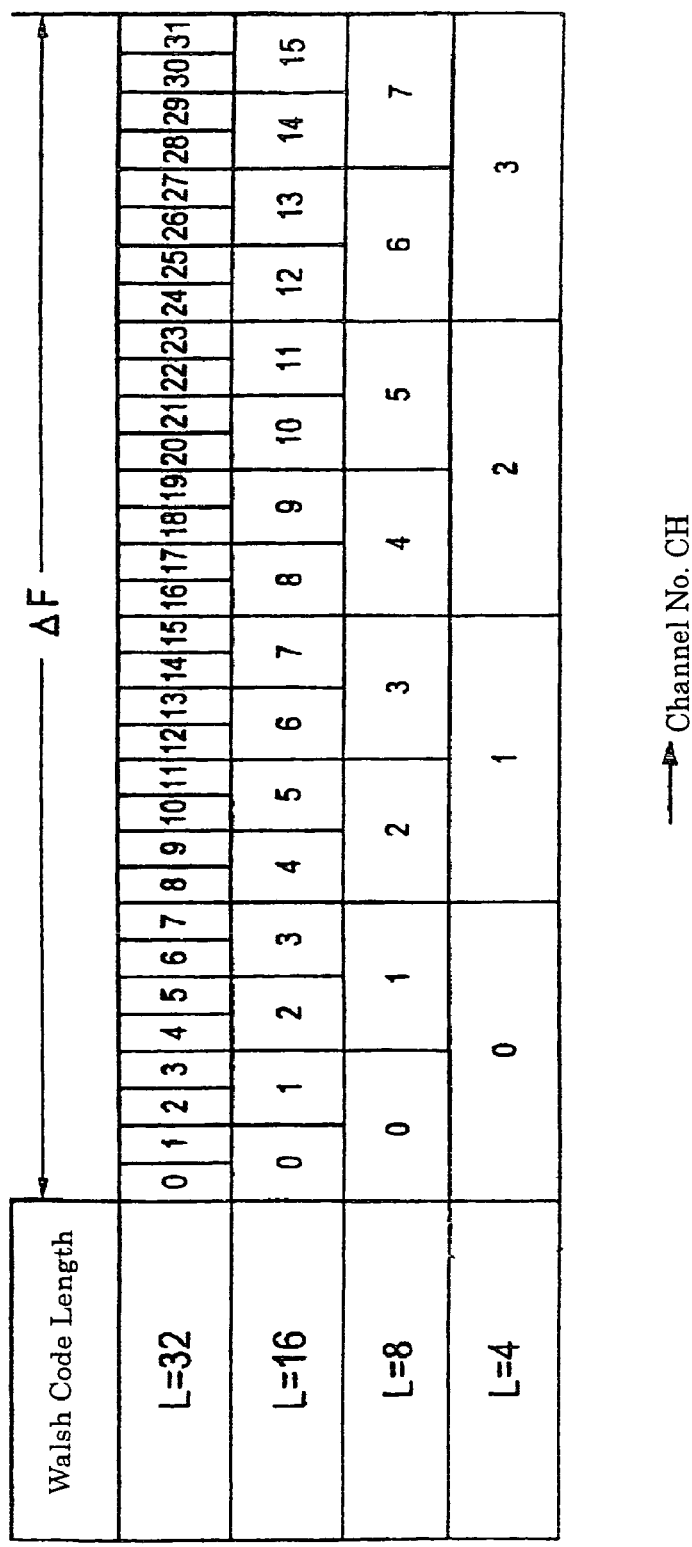
FIG. 7 is a diagram showing diffusion code numbers.

The present invention further proposes that in the graphing means 33B the display positions in X-axis direction of the display regions W5-W128 be not defined by the diffusion code numbers shown in FIG. 7 but defined in accordance with Paley order.

FIG. 7 shows a relation between Walsh code length and Walsh code. L=4, L=8, L=16, . . . shown in the left column represent Walsh lengths. At Walsh code length L=4, a predetermined band width ΔF is divided in four and four channels of 0, 1, 2, and 3 are allocated thereto. The channel numbers 0, 1, 2, and 3 of the four channels are given in terms of Walsh code numbers 0, 1, 2, and 3. As is seen from FIG. 7, as Walsh code length becomes larger, the number of employable channels increases in a doubly increasing relation and an employable band width becomes narrower in decrements of ½. From this relation it will be seen that a short Walsh code length is allocated to a telephone set which handles a large volume of data to be transmitted, while a long Walsh code length is allocated to a telephone set which handles a small volume of data. In FIG. 7 Walsh code lengths 64 and 128 are omitted.

According to Paley order, numbers are given in terms of bit numbers corresponding to Walsh code lengths as diffusion codes shown in FIG. 8A and the arrangement of bits obtained when the numbers are represented in binary is reversed. The numbers in such a reverse bit order become the numbers in Paley order.

More specifically, Paley order is as shown in FIG. 8B relative to the arrangement of Walsh codes shown in FIG. 8A. FIG. 9A shows an ordinary order of Walsh codes and FIG. 9B shows Paley order.

Figure 10:
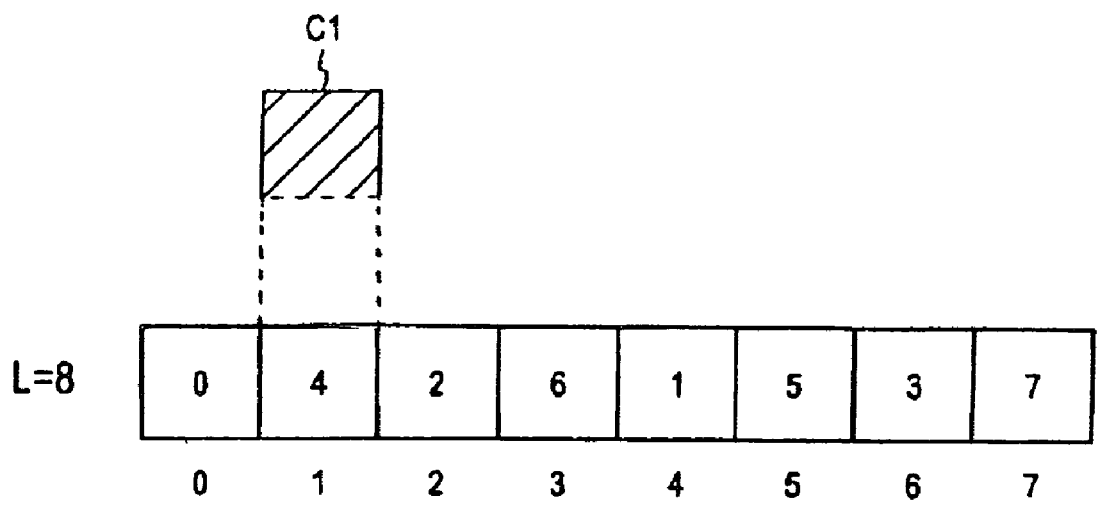
FIG. 10 is a diagram showing a layout of graphs arranged in Paley order.
Figure 10:
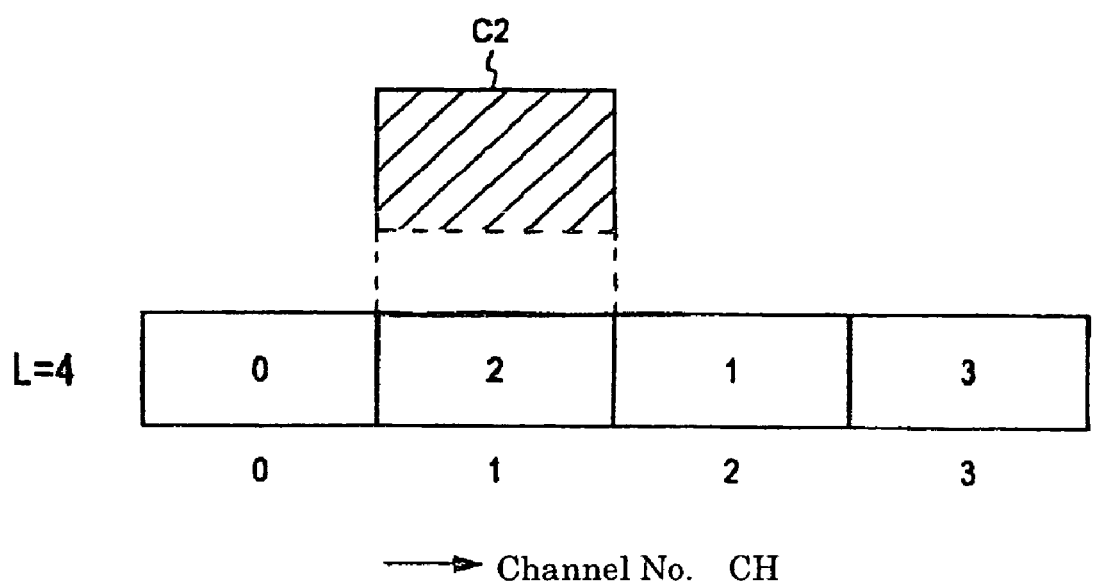

By defining the position on X axis of each channel in a multiplexed signal in accordance with Paley order, there accrues an advantage that there can be made display without overlapping of display regions as in FIG. 10. It is preferable that signal component and noise component be displayed in display regions C1 and C2. This is the same as in the above description taken in connection with FIG. 6.

This is for the following reason. In this type of a communication device, there is established a limitation so as to select channels in which diffusion codes are in an orthogonal relation for diminishing interference between channels. In case of selecting channels in accordance with the said limitation of channel selection, there arises a condition in which display regions overlap each other in display, as is illustrated in FIG. 11.

Figure 11:
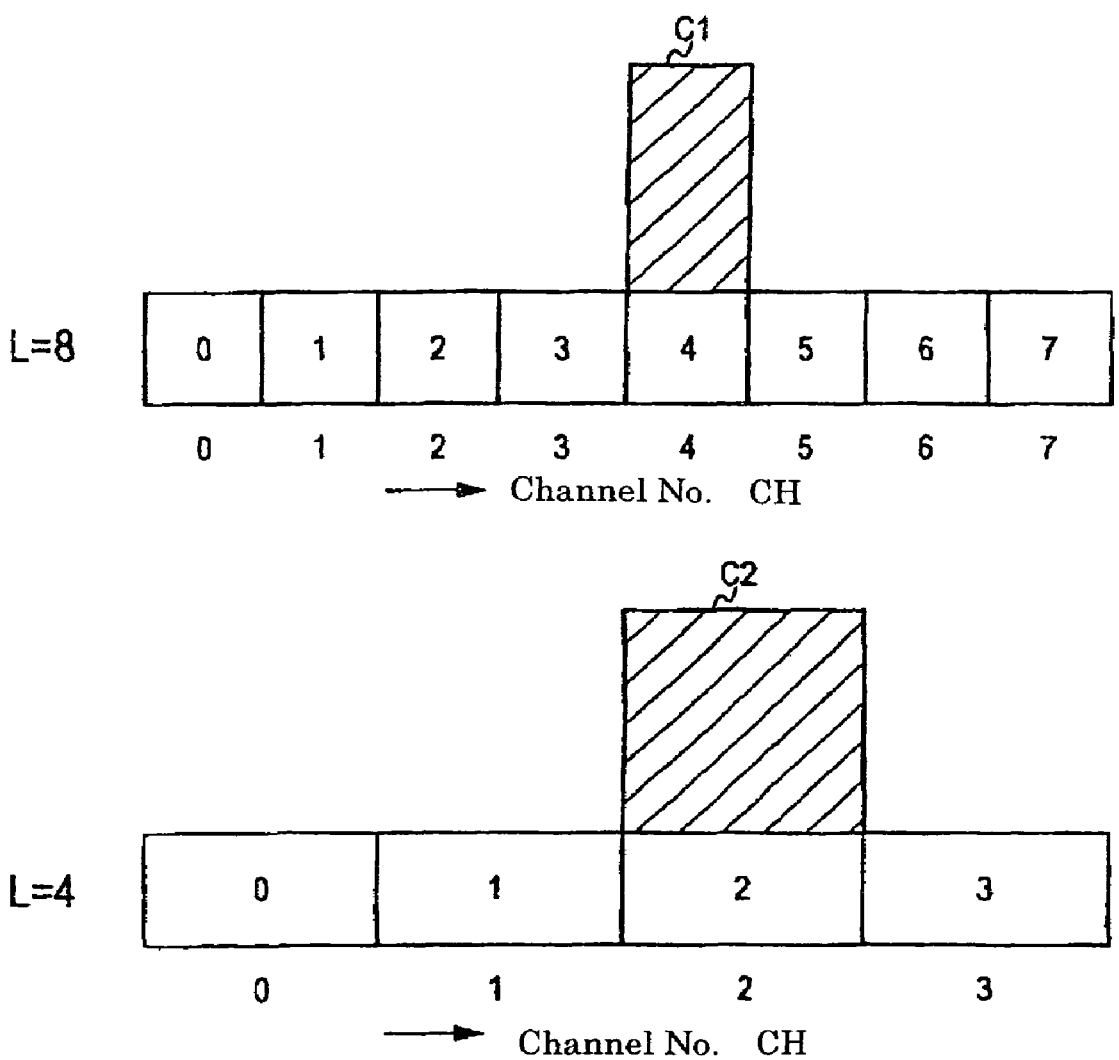
FIG. 11 is a diagram showing a layout of graphs arranged in an ordinary order.

More specifically, in the case where there is displayed an electric power of a signal corresponding to a combination of code number 2 in Walsh code length L=4 and code number 4 in Walsh code length L=8, which combination is also a normal combination, the power displaying region C1 and C2 overlap each other as in FIG. 11. In this case, the power display of code number 4 in Walsh code length L=8 is included within the display region C2 and it becomes uncertain whether a signal of the channel corresponding to code number 4 in Walsh code length L=8 is present or not.

That is, there is a case where only the display region C2 appears to be present and there also is a case where signals appear to be present in both code numbers 4 and 5 of Walsh code length L=8, thus giving rise to the drawback that the measurement becomes indistinct.

For remedying this drawback the present invention proposes that the display positions on X axis of the display regions W4~W128 be determined in accordance with Paley order.

FIG. 10 shows a state in which the overlapped state of both display regions C1 and C2 in FIG. 11 has been extinguished by making the display in accordance with Paley order. In case of the diffusion code length L=4, Paley order is like 0, 2, 1, 3 in terms of diffusion code numbers as in FIG. 9B. This order of diffusion code numbers 0, 2, 1, 3 corresponds to channel numbers 0, 1, 2, 3.

On the other hand, with the diffusion code length L=8, Paley order is like 0, 4, 2, 6, 1, 5, 3, 7 as is apparent from FIG. 8B.

The display region C1 shown in FIG. 11 displays an power of a signal which belongs to diffusion code number 4, and therefore, in accordance with Paley order the power is displayed in the position of channel No. 1 in L=8, as shown in FIG. 10.

On the other hand, the display region C2 shown in FIG. 11 displays an electric power of a signal which belongs to diffusion code number 2 in L=4, and therefore, in accordance with Paley order the power is displayed in the position of channel No. 1 in L=4.

As is seen from FIG. 10, the display regions C1 and C2 do not overlap each other in display. In other words, channels selected in accordance with channel selecting conditions in a communication device (a portable telephone set) described previously never overlap in their channel positions when conversion is made into Paley order.

Figure 12:
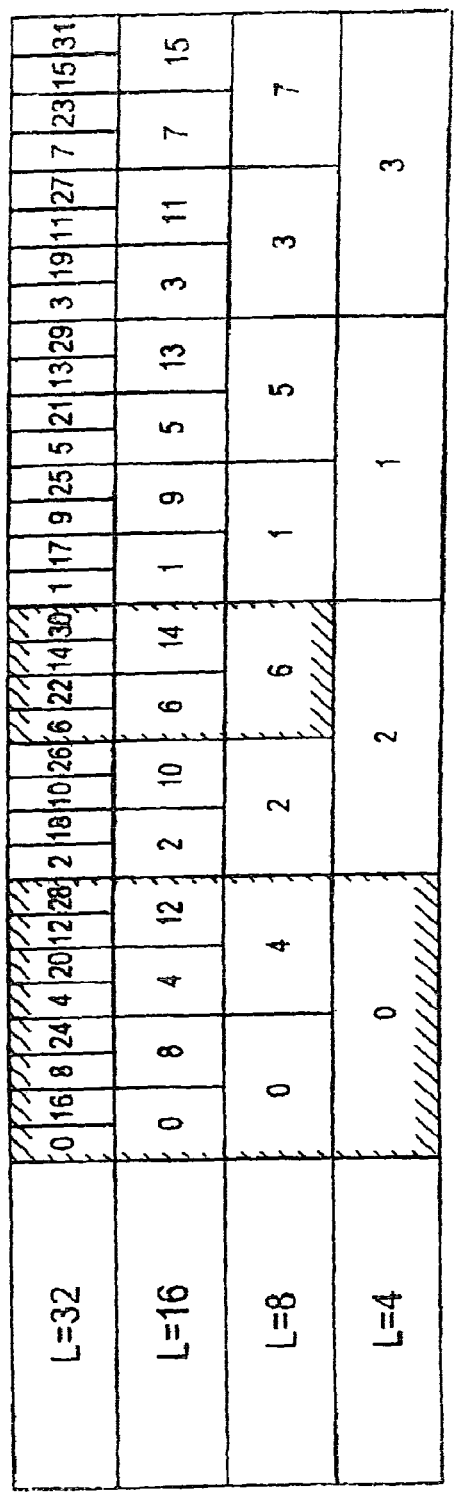
FIG. 12 is a diagram showing a state in which diffusion code numbers in diffusion code length L=0 has been re-arranged in accordance with Paley order.
Figure 13:
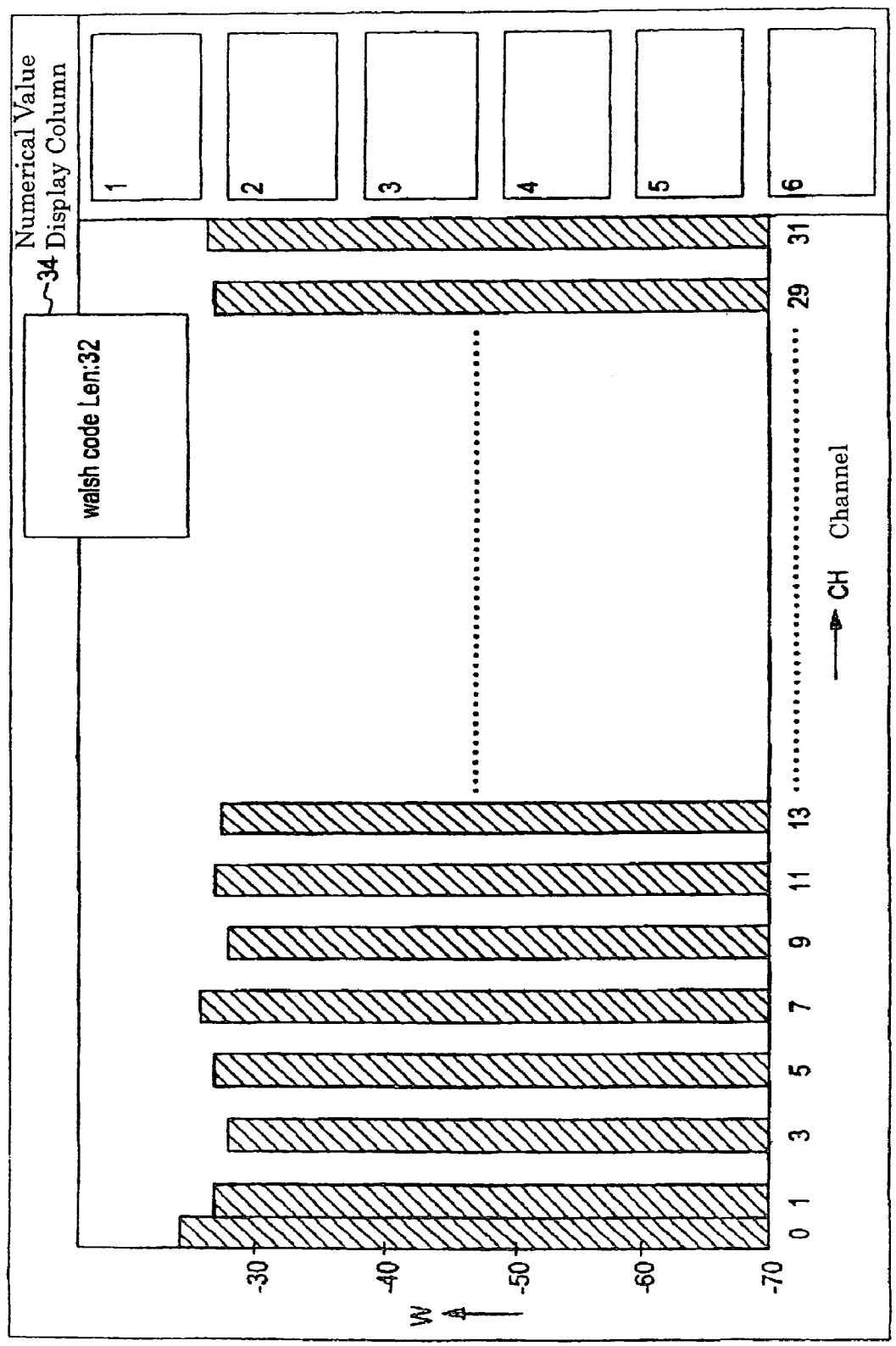
FIG. 13 is a diagram showing an example of an power display of various channels in the prior art.

The reason for this will now be described with reference to FIG. 12. FIG. 12 shows a state in which diffusion code numbers in diffusion code length L=0 has been re-arranged in accordance with Paley order.

The channel selecting condition in a communication device is as follows: "A channel of a higher hierarchical level than the selected channel should not be selected." In this connection, it is apparent that when code number 1 in L=4 and code number 1 in L=8 are selected, the code relations are not orthogonal to each other. For example, in the case where a channel specified by code number 0 in L=4 is selected, it follows that channels specified by overlying code numbers 0, 4 in L=8, code numbers 0, 8, 4, 12 in L=16, and code numbers 0, 16, 8, 24, 4, 20, 12, 28 in L=32 do not satisfy the selection condition.

Likewise, when there is used a channel specified by code number 6 in L=8, channels specified by overlying code numbers 6, 14 in L=16 and code numbers 6, 22, 14, 30 in L=32 do not satisfy the channel selecting condition.

As is apparent from the above description, as to a channel selected in accordance with the channel selecting condition in a portable telephone set, if a display position of the channel is specified in accordance with Paley order, there never occurs a positional overlap in display.

This principle is also applicable to a method of determining a channel to be used in a base station for portable telephone.

The above embodiments can be implemented in the following manner. In a computer provided with a CPU, a hard disk, and a media (e.g., floppy disk and CD-ROM) reader, the media reader is allowed to read a media which stores programs for implementing the foregoing components and the read data are installed in a hard disk. Even with such a method it is possible to implement the functions described above.

According to the present invention, as set forth above, since both signal power and noise power of each channel in CDMA signal are measured at a time and the result of the measurement is displayed on one and same screen, so it is possible to know a signal-to-noise ratio (S/N) at a glance. As a result, for example in case of building a base station for portable telephone and making a shipping inspection or in the event of failure of the base station which is in service, it is possible to detect immediately in which channel noise is occurring. Thus it is possible to provide a measuring instrument which is convenient for use.

The invention claimed is:

1. A CDMA signal waveform quality display system, comprising:

an orthogonal transformer configured to orthogonally transform a digital measurement signal in each channel into a base band signal and to correct a carrier frequency error;

a demodulator configured to demodulate the measurement signal in each channel corrected by said orthogonal transformer to afford demodulated data and an amplitude value;

an ideal signal generator configured to generate an ideal signal in each channel from said demodulated data, said amplitude value, and estimated parameters;

a parameter estimator configured to estimate various parameters in each channel from said ideal signal in each channel and the corrected measurement signal in each channel;

an optimizer configured to, using said estimated parameters, perform the correction in said orthogonal transformer and the generation of the ideal signal in said ideal signal generator, and to further perform the processings in said demodulator and said parameter estimator, the optimizer being further configured to repeat said correction, demodulation, and estimation until said estimated parameters are optimized;

a power coefficient calculator configured to calculate a power coefficient of the measurement signal in each channel in the optimized state in said optimizer;

a noise power coefficient calculator configured to calculate a noise coefficient channel by channel; and a calculation result display configured to determine a signal power and a noise power on the basis of the power coefficient in each channel calculated in said power coefficient calculator and the noise power coefficient in each channel calculated in said noise power coefficient calculator and to display said signal power and noise power on a single display.

2. A CDMA signal waveform quality display system, comprising:

a power measurer configured to measure a signal component power of a signal to be measured in a specific channel to be measured;

a noise component power measurer configured to measure a noise component power of the signal to be measured in the channel to be measured; and a calculation result display configured to display a graph having a length proportional to the value of said signal component power and a graph having a length proportional to the value of said noise component power in such a manner that in a length direction of one of said graphs there is disposed the other graph, said graphs each having a width corresponding to a band width of the channel to be measured, wherein said calculation result display is further configured to display said graphs in an arrangement of graphs that avoids overlapping of the graphs, said band width being determined by a diffusion code length corresponding to the channel to be measured.

3. A CDMA signal waveform quality display system according to claim 2, wherein said calculation result display is further configured to display said graphs in an arrangement in accordance with a Paley order to avoid overlapping of the graphs.

4. A CDMA signal waveform quality display method, comprising:

orthogonally transforming a digital measurement signal in each channel into a base band signal and correcting a carrier frequency error;

demodulating the measurement signal in each channel corrected by the orthogonal transforming to afford demodulated data and an amplitude value;

generating an ideal signal in each channel from the demodulated data, the amplitude value, and estimated parameters;

estimating various parameters in each channel from the ideal signal in each channel and the corrected measurement signal in each channel;

optimizing, using the estimated parameters, the correction in the orthogonal transforming and the generation of the ideal signal in the ideal signal generating, and the processings in the demodulating and the parameter estimating, and repeating the correction, demodulation, and estimation until the estimated parameters are optimized;

calculating a power coefficient of the measurement signal in each channel in the optimized state in the optimizing;

calculating a noise power coefficient channel by channel; and displaying a calculation result which determines a signal power and a noise power on the basis of the power coefficient in each channel calculated in the power coefficient calculating and the noise power coefficient in each channel calculated in the noise power coefficient calculating and which displays the signal power and the noise power on a single display.

5. A computer readable medium that stores a computer program for execution by a computer to perform a CDMA signal waveform quality display, the computer readable medium comprising:

an orthogonal transformation code segment for orthogonally transforming a digital measurement signal in each channel into a base band signal and correcting a carrier frequency error;

a demodulating code segment for demodulating the measurement signal in each channel corrected by the orthogonal transformation to afford demodulated data and a amplitude value;

an ideal signal generating code segment for generating an ideal signal in each channel from the demodulated data, the amplitude value, and estimated parameters;

a parameter estimating code segment for estimating various parameters in each channel from the ideal signal in each channel and the corrected measurement signal in each channel;

an optimizing code segment which, using the estimated parameters, corrects the orthogonal transformation and the ideal signal generating and, further performs the demodulating and the parameter estimating, and which repeats the correction, demodulation, and estimation until the estimated parameters achieve an optimized state;

a power coefficient calculating code segment which calculates a power coefficient of the measurement signal in each channel in the optimized state;

a noise power coefficient calculating code segment which calculates a noise coefficient channel by channel; and a calculation result display code segment which determines a signal power and a noise power on the basis of the power coefficient in each channel calculated in the power coefficient calculating and the noise power coefficient in each channel calculated in the noise power coefficient calculating, and which display the signal power and noise power on a single display.

6. A computer readable medium that stores a computer program for execution by a computer to perform a CDMA signal waveform quality display, the computer readable medium comprising:

a power measuring code segment for measuring a signal component power of a signal to be measured in a specific channel to be measured;

a noise component power measuring code segment for measuring a noise component power of the signal to be measured in the channel to measured; and a calculation result display code segment for displaying a graph having a length proportional to the value of the signal component power and a graph having a length proportional to the value of the noise component power in such a manner that in a length direction of one of the graphs there is disposed the other graph.

7. A computer-readable medium having a program of instructions for execution by the computer to perform a CDMA signal waveform quality display processing, said CDMA signal waveform quality display processing comprising:

an orthogonal transformation process for orthogonal transformation of a digital measurement signal in each channel into a base band signal and correcting a carrier frequency error;

a demodulating process for demodulating the measurement signal in each channel corrected by said orthogonal transformation process to afford demodulated data and an amplitude value;

an ideal signal generating process for generating an ideal signal in each channel from said demodulated data, said amplitude value, and estimated parameters;

a parameter estimating process for estimating various parameters in each channel from said ideal signal in each channel and the corrected measurement signal in each channel;

an optimizing process which, using said estimated parameters, performs the correction in said orthogonal transformation process and the generation of the ideal signal in said ideal signal generating process, further performing the processings in said demodulating process and said parameter estimating process, and which repeats said correction, demodulation, and estimation until said estimated parameters are optimized;

a power coefficient calculating process which calculates a power coefficient of the measurement signal in each channel in the optimized state in said optimizing process;

a noise power coefficient calculating process which calculates a noise coefficient channel by channel; and a calculation result display process which determines a signal power and a noise power on the basis of the power coefficient in each channel calculated in said power coefficient calculating process and the noise power coefficient in each channel calculated in said noise power coefficient calculating process and which display said signal power and noise power on one and same display.

8. A CDMA signal waveform quality display system, comprising:

an orthogonal transformer for orthogonal transformation of a digital measurement signal in each channel into a base band signal and correcting a carrier frequency error;

a demodulator for demodulating the measurement signal in each channel corrected by said orthogonal transformer to afford demodulated data and an amplitude value;

an ideal signal generator for generating an ideal signal in each channel from said demodulated data, said amplitude value, and estimated parameters;

a parameter estimator for estimating various parameters in each channel from said ideal signal in each channel and the corrected measurement signal in each channel;

an optimizer which, using said estimated parameters, performs the correction in said orthogonal transformer and the generation of the ideal signal in said ideal signal generator, further performing the processings in said demodulator and said parameter estimator, and which repeats said correction, demodulation, and estimation until said estimated parameters are optimized;

a power coefficient calculator which calculates a power coefficient of the measurement signal in each channel in the optimized state in said optimizing element, a noise power coefficient calculator which calculates a noise coefficient channel by channel; and a calculation result display which determines a signal power and a noise power on the basis of the power coefficient in each channel calculated in said power coefficient calculator and the noise power coefficient in each channel calculated in said noise power coefficient calculator and which displays said signal power and noise power on a single display.

9. A CDMA signal waveform quality display system, comprising:

a power measurer configured to measure a signal component power of a signal to be measured in a specific channel to be measured;

a noise component power measurer configured to measure a noise component power of the signal to be measured in the channel to be measured;

a calculation result display configured to display a graph having a length proportional to the value of said signal component power and a graph having a length proportional to the value of said noise component power in such a manner that in a length direction of one of said graphs there is disposed the other graph, said graphs each having a width corresponding to a band width of the channel to be measured, wherein said calculation result display causes a marker to be displayed on a display surface and displays the value of said signal component power and of said noise component power in a position indicated by said marker, and wherein said calculation result display is further configured to display said graphs in an arrangement of graphs that avoids overlapping of the graphs, said band width being determined by a diffusion code length corresponding to the channel to be measured.

10. A CDMA signal waveform quality display system, comprising:

a power measurer configured to measure a signal component power of a signal to be measured in a specific channel to be measured;

a noise component power measurer configured to measure a noise component power of the signal to be measured in the channel to be measured; and a calculation result display configured to display a graph having a length proportional to the value of said signal component power and a graph having a length proportional to the value of said noise component power in such a manner that in a length direction of one of said graphs there is disposed the other graph, said graphs each having a width corresponding to a band width of the channel to be measured, wherein when said channel to be measured is free of said signal component power, said calculation result display being further configured to display the graph having a length proportional to the value of said noise component power;

wherein said calculation result display is further configured to cause a marker to be displayed on a display surface and to display the value of said signal component power and of said noise component power in a position indicated by said marker; and wherein said calculation result display is further configured to display said graphs in an arrangement in accordance with a Paley order to avoid overlapping of the graphs.

* * * * *